United States Patent
Hong (10) Patent No.: US 7,522,237 B2
(45) Date of Patent: Apr. 21, 2009

(54) LIQUID CRYSTAL DISPLAY AND ARRAY SUBSTRATE FOR THE SAME

(75) Inventor: Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 11/790,821

(22) Filed: Apr. 27, 2007

(65) Prior Publication Data

US 2007/0258028 A1 Nov. 8, 2007

(30) Foreign Application Priority Data

Apr. 28, 2006 (KR) .................. 10-2006-0038788

(51) Int. Cl.
*G02F 1/1335* (2006.01)
(52) U.S. Cl. ...................... 349/114; 349/108
(58) Field of Classification Search ............. 349/38, 349/39, 106–108, 113–114, 117
See application file for complete search history.

(56) References Cited

U.S. PATENT DOCUMENTS 7,443,468 B2 * 10/2008 Okita et al. ................. 349/107

* cited by examiner

*Primary Examiner*—Hemang Sanghavi
(74) *Attorney, Agent, or Firm*—Morgan Lewis & Bockius LLP

(57) ABSTRACT

A liquid crystal display device includes a first and a second substrates, the second substrate has a color pixel that includes a reference and a correction color pixels, the reference and correction color pixels each has a reflection area, a transmission area, and a thin film transistor, a reflection electrode is provided in the reflection area, and a transmission electrode is provided in the transmission area wherein the transmission electrode electrically connected to the thin film transistor; and a liquid crystal layer provided between the first and second substrates, wherein a data voltage applied to the transmission electrode of the reference color pixel is applied to the reflection electrode of the reference color pixel, and the data voltage applied to the transmission electrode of the correction color pixel is reduced to a compensation voltage and the compensation voltage is applied to the reflection electrode of the correction color pixel.

21 Claims, 10 Drawing Sheets

LIQUID CRYSTAL DISPLAY AND ARRAY SUBSTRATE FOR THE SAME

This application claims the benefit of Korean Patent Application No. 10-2006-038788 filed in Korea on Apr. 28, 2006, which is hereby incorporated by reference.

BACKGROUND OF THE INVENTION

1. Field of the Invention

This document relates to a display apparatus, and more particularly, to a liquid crystal display device and an array substrate for that device.

2. Discussion of the Related Art

In related art liquid crystal display devices, a liquid crystal layer having an anisotropic dielectric constant characteristic is formed between a color filter substrate and an array substrate. When an electric field is applied to a liquid crystal material, molecular arrangement of the liquid crystal material changes by the intensity of an electric field to transmit light through the color filer substrate. An amount of light transmit through the color filter substrate is controlled, thereby displaying a desired image. In general, the related art liquid crystal display devices including a thin film transistor-liquid crystal display (TFT-LCD) device uses a TFT as a switching device.

The related art liquid crystal display devices are not the self-emissive type display device. Accordingly, a separate external light source is necessary. The related art liquid crystal display devices are classified into a backlit type liquid crystal display device (backlit type) and a reflective type liquid crystal display device (reflective type), depending on a kind of light source used. In the related art backlit type, a backlight unit is assembled at a rear surface of the backlit type and the light is generated from the backlight unit. In the related art reflective type, external light is reflected on a color filter substrate.

Recently, transflective type liquid crystal display devices (transflective type) have been developed. In the transflective type, one color pixel includes a reflection area and a transmission area and a length of an optical path in the reflection area is twice as long as that of the transmission area. The transflective type reduces unnecessary power consumption caused by the backlight unit, displays images even when there is no external light source, and switches an operation mode freely between a reflection mode or a transmission mode. In addition, the light reflected on the transflective type travels through a liquid crystal layer positioned between a color filter substrate and an array substrate twice as fast as that of the related art liquid crystal display device.

To reduce a retardation difference of light caused by the difference in the optical paths, a cell gap in the reflection area is set to be greater than a cell gap in the transmission area. Accordingly, a phase retardation of the reflection area and a phase retardation of the transmission area are maintained at an equal level, thereby continuously maintains a luminance in the transflective type when running in the reflection mode and the transmission mode.

In the transflective type, an upper retardation film is provided on an upper portion of the color filter substrate and a second retardation film is positioned on a second portion of the array substrate to compensate the retardation difference. In general, the transflective type uses a retardation film to compensate difference in the transmittance-voltage curves among the transmission areas of red, green and blue color pixels. Each transmission area includes unique transmittance-voltage characteristic. In this case, the red, green and blue color pixels each have a different black driving voltage (reflectivity=0) in red, green and blue wavelength bands (red≈450 nm, green≈550 nm, and blue≈650 nm).

To obtain the retardation difference in a visible light band (about 300-700 nm) including all the red, green and blue wavelength bands, a wideband retardation film having a multi-layered structure is necessary. The wideband retardation film allows reflectivity-voltage characteristic curves of the reflection areas in red, green and blue color pixels to be equal to each other. In addition, the transmittance-voltage characteristic curves of the transmission areas in each color pixel to be equal to one another. However, since the wideband retardation film is thick due to its multi-layered structure, it is difficult to manufacture the liquid crystal display device thinner and lighter at a lower cost.

SUMMARY OF THE INVENTION

Accordingly, the present invention is directed to a liquid crystal display device and array substrate for the same that substantially obviates one or more of the problems due to limitations and disadvantages of the related art.

An object of the present invention is to provide an array substrate that maintains an equal luminance in each color pixels by improving the structures of color pixels.

Another object of the present invention is to provide a liquid crystal display device that implementing such array substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as claimed and broadly described, a liquid crystal display device includes a first substrate; a second substrate facing the first substrate including a color pixel, the color pixel including a reference color pixel and a correction color pixel, the reference color pixel and the correction color pixel each including a reflection area and a transmission area, the reference color pixel and the correction color pixel each including a thin film transistor, a reflection electrode provided in the reflection area, and a transmission electrode provided in the transmission area to be electrically connected to the thin film transistor; and a liquid crystal layer provided between the first substrate and the second substrate, wherein a data voltage applied to the transmission electrode of the reference color pixel is applied to the reflection electrode of the reference color pixel, and the data voltage applied to the transmission electrode of the correction color pixel is reduced to a compensation voltage, wherein the compensation voltage is applied to the reflection electrode of the correction color pixel.

In another aspect, a liquid crystal display device includes a first substrate; a second substrate facing the first substrate including a color pixel, the color pixel including a reference color pixel and a correction color pixel, the reference color pixel and the correction color pixel each includes a thin film transistor and a reflection electrode electrically connected to the thin film transistor; and a liquid crystal layer provided between the first substrate and the second substrate, wherein a data voltage applied to the thin film transistor of the reference color pixel is applied to the reflection electrode of the reference color pixel, the data voltage applied to the thin film transistor of the correction color pixel is reduced to a compensation voltage, and the compensation voltage is applied to the reflection electrode of the correction color pixel.

In another aspect, an array substrate includes a gate line and a data line intersecting perpendicularly to each other to define an area of a color pixel, wherein the color pixel includes a reference color pixel and a correction color pixel; a thin film transistor at an intersection of the gate line and the data line; a reflection electrode provided in a reflection area of the color pixel; and a transmission electrode provided in a transmission area of the color pixel, the transmission electrode electrically connected to the thin film transistor, wherein a data voltage applied to the transmission electrode of the reference color pixel is applied to the reflection electrode of the reference color pixel, the data voltage applied to the transmission electrode of the correction color pixel is reduced to a compensation voltage, and the compensation voltage is applied to the reflection electrode of the correction color pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
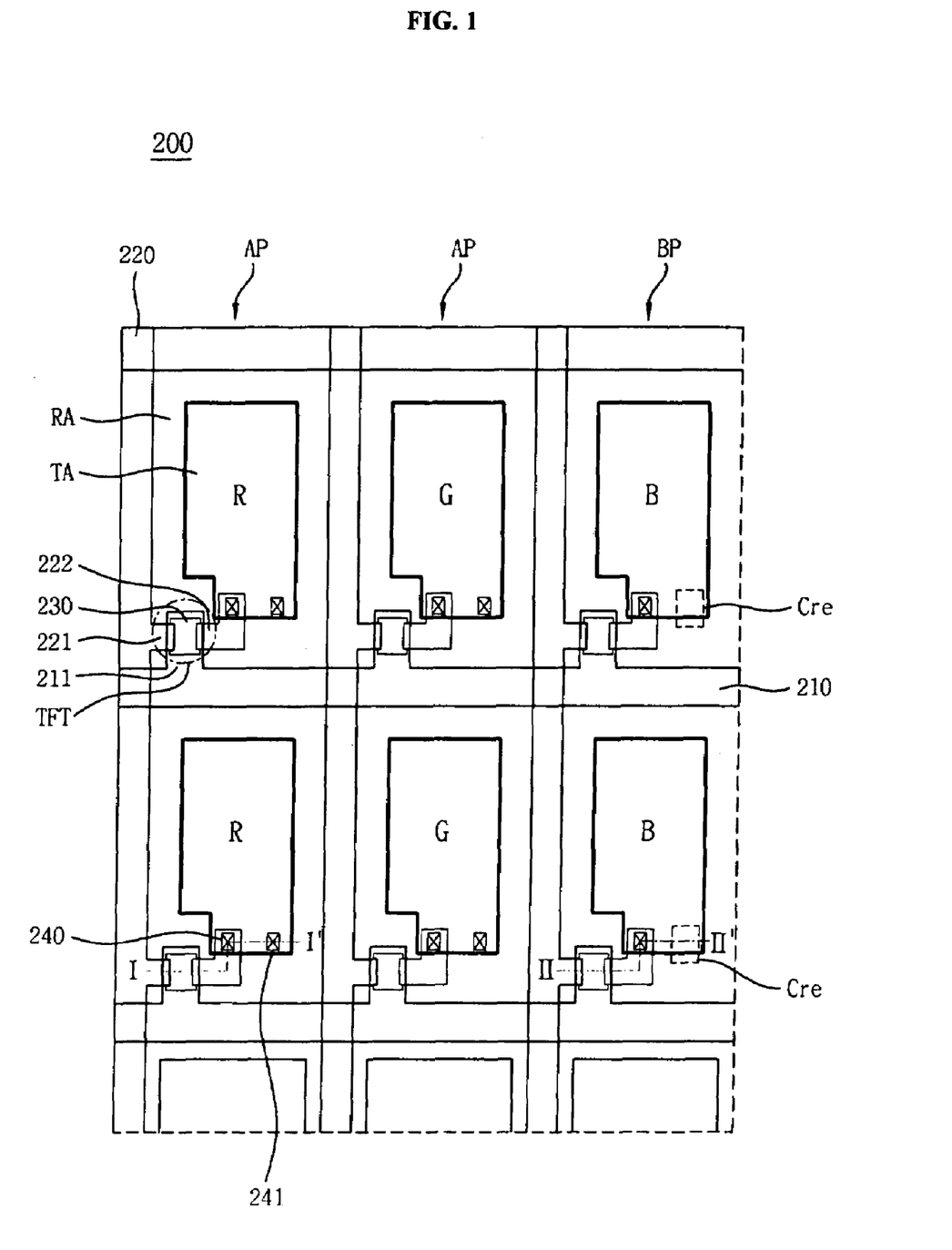
FIG. 1 is a plane view of a transflective type liquid crystal display device according to a first exemplary embodiment.
Figure 2:
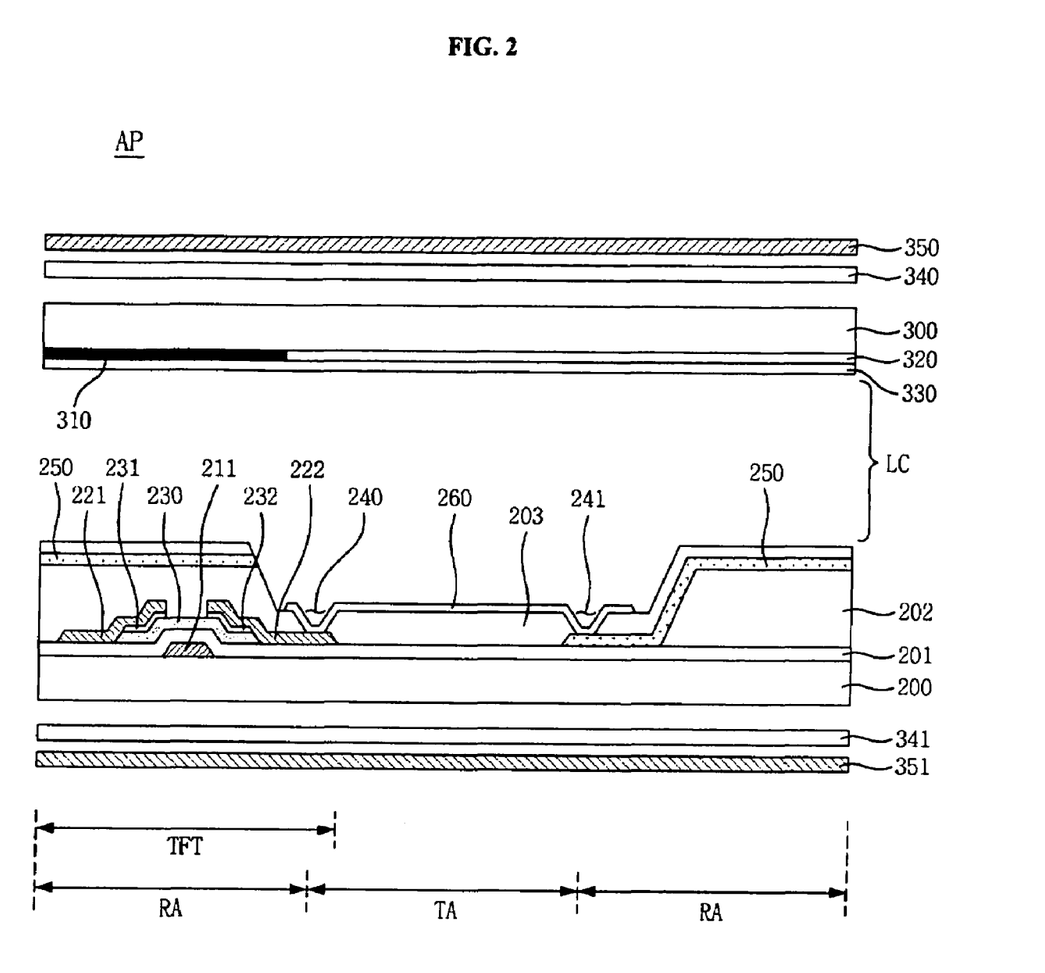
FIG. 2 is a cross-sectional view taken along line I-I' of the first exemplary liquid crystal display device shown in FIG. 1.
Figure 3:
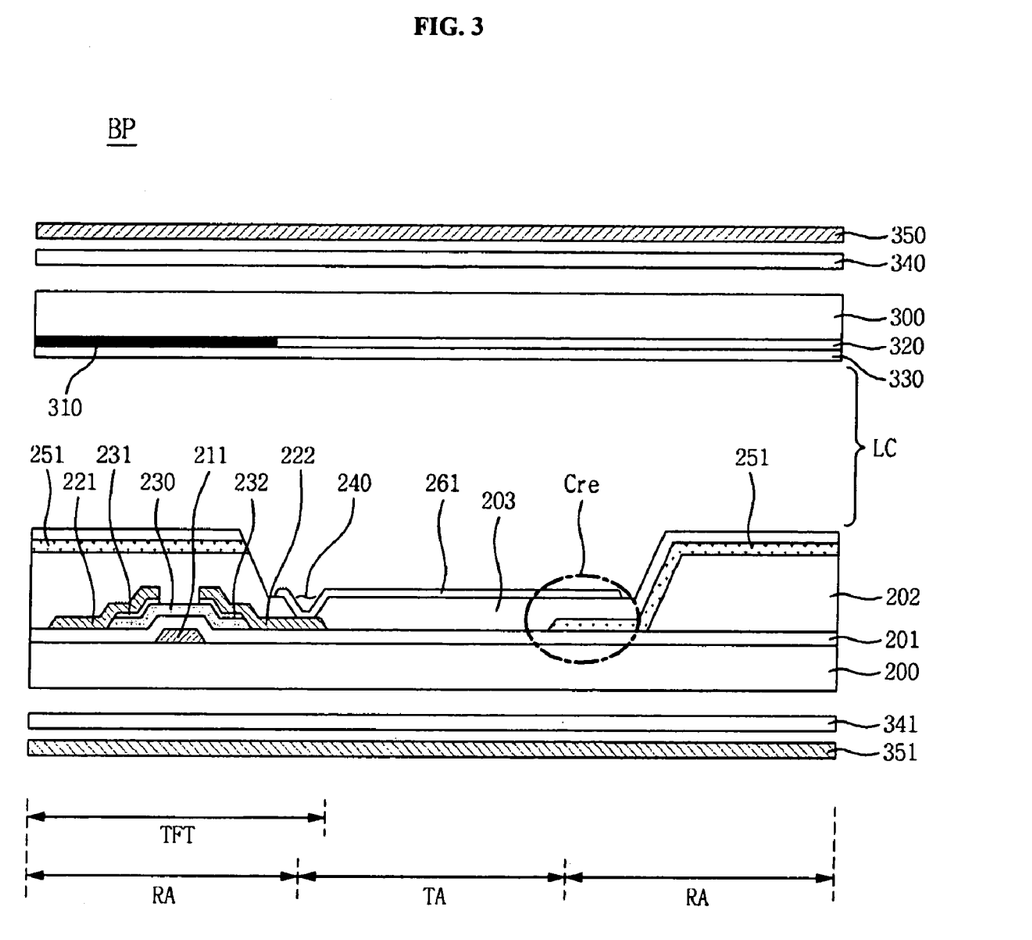
FIG. 3 is a cross-sectional view taken along line II-II' of the first exemplary liquid crystal display device shown in FIG. 1.

FIG. 1 is a plane view of a transflective type liquid crystal display device according to a first exemplary embodiment of the present invention. FIGS. 2 and 3 are cross-sectional views taken along lines I-I' and II-II' of FIG. 1. As shown in FIGS. 1 to 3, the transflective type liquid crystal display device according to the first exemplary embodiment includes an upper substrate 300 and a lower substrate 200, and a liquid crystal layer LC between the two substrates 200 and 300 to control an optical path of light.

The lower substrate 200 is an array substrate that includes a plurality of red, green and blue color pixels R, G and B in matrix. A plurality of data lines 220 and a plurality of gate lines 210 define the each of the red, green and blue color pixel areas R, G and B. Each color pixel R, G and B includes a reflection area RA and a transmission area TA. Reflection electrodes 250 and 251 are provided in a reflection area RA, and transmission electrodes 260 and 261 are provided in a transmission area TA. The transmission electrodes 260 and 261 do not overlap the reflection electrodes 250 and 251.

A thin film transistor TFT is positioned at an intersection of the gate line 210 and the data line 220. The reflection electrodes 250 and 251 in the reflection area RA are made of a metal with good reflectivity such as aluminum (Al) and copper (Cu). The transmission electrodes 260 and 261 are made of a transparent conductive layer. As shown in FIGS. 2 and 3, the transmission electrodes 260 and 261 are formed in the transmission area TA where no reflection electrodes 250 and 251 are formed.

As shown in FIG. 2, a lower quarter-wave (λ4) plate (QWP) 341 and a lower polarization plate 351 are formed on a lower portion of the lower substrate 200. A backlight unit (not illustrated) is positioned under the lower polarization plate 351. The upper substrate 300 is a color filter substrate and includes a black matrix 310, red, green and blue color filter layers 320, and a common electrode 330. The black matrix 310 is positioned outside the color pixel areas R, G and B, and blocks light. The color filter layer 320 displays respective color pixels red, green and blue R, G and B. The common electrode 330 and the reflection electrodes 250 and 251 or the common electrode 330 and the transmission electrodes 260 and 261 form an electric field.

The common electrode 330 on the lower substrate 300 faces the reflection electrodes 250 and 251 and the transmission electrodes 260 and 261 on the lower substrate 200. An upper QWP 340 and an upper polarization plate 350 are formed on an upper portion of the upper substrate 300. The upper and lower QWPs 340 and 341 change a state of polarized light. In other words, the upper and lower QWPs 340 and 341 change linear polarization into circular polarization, or circular polarization into linear polarization. The upper and lower polarization plates 350 and 351 are positioned outside the upper and lower QWPs 340 and 341 to pass through light in a direction parallel to an optical axis only, thereby changing natural light or light generated in a light source into linear polarization.

In a reflection mode, the reflection electrodes 250 and 251 reflect light generated outside the upper substrate 300. In a transmission mode, light generated in the backlight unit is transmitted through the upper substrate 300 through the transparent transmission electrodes 260 and 261. The thin film transistor TFT acts as a switch to turn on the operation to apply a voltage to the reflection electrodes 250 and 251 and the transmission electrodes 260 and 261. This results in a change in a phase retardation of the liquid crystal layer LC. Light is transmitted and reflected through the liquid crystal layer LC, thereby displaying an image.

In the reflection mode, the liquid crystal display uses natural light generated outside or an artificial light. Light entering the upper substrate 300 is reflected by the reflection electrodes 250 and 251 to pass through the liquid crystal layer LC. The liquid crystal layer LC changes its molecular arrangement by the application of electric field generated between the reflection electrodes 250 and 251 and the common electrode 330. The amount of light passing through the liquid crystal layer LC is controlled by the molecular arrangement of the liquid crystal layer LC.

In the transmission mode, light generated in the backlight unit is used as a light source. Light generated in the backlight unit enters the liquid crystal layer LC through the transmission electrodes 260 and 261. The amount of light transmits through the liquid crystal layer LC is controlled by the molecular arrangement of the liquid crystal layer LC. The electric field generated between the transmission electrodes 260 and 261 and the common electrode 330 changes the molecular arrangement of the liquid crystal layer LC, thereby displaying the image. Each of the red, green and blue color pixels R, G and B may be divided into a reference color pixel and a correction color pixel depending on structures of the reflection electrodes 250 and 251 and the transmission electrodes 260 and 261.

As shown in FIG. 1, the red, green and blue color pixels R, G and B are arranged parallel to each other in a horizontal direction on the lower substrate 200. In other words, the red, green and blue color pixels R, G and B are arranged in a stripe form. The red and green color pixels R and G have a reference color pixel structure AP, and the blue color pixel B has a correction color pixel structure BP.

FIGS. 2 and 3 are cross-sectional views of the reference color pixel structure AP and the correction color pixel structure BP, respectively. As shown in FIG. 2, the reflection electrode 250 and the transmission electrode 260 of the reference color pixel structure AP electrically contact each other on the lower substrate 200. In addition, a data voltage applied to the transmission electrode 260 through a first contact hole 240 (when TFT is turned on) is applied to. the reflection electrode 250 through a second contact hole 241 without changing the magnitude of the data voltage. As shown in FIG. 3, the reflection electrode 251 and the transmission electrode 261 of the correction color pixel structure BP form a correction capacitance $C_{re}$ with an insulating layer 203 therebetween. When a data voltage is applied to the transmission electrode 261 of the correction color pixel BP, a compensate voltage is induced to the reflection electrode 251 by the correction capacitance $C_{re}$.

The thin film transistor TFT shown in FIGS. 2 and 3 include a gate electrode 211 protruded from a gate line 210 on the lower substrate 200, a gate insulating layer 201 provided on the lower substrate 200 including the gate electrode 211, a semiconductor later 230 over the gate electrode 211, and a source electrode 221 and a drain electrode 222 on the semiconductor later 230. Resistant contact layers 231 and 232 are formed between the semiconductor later 230 and the source electrode 221 and between the semiconductor later 230 and the drain electrode 222, respectively.

As shown in FIGS. 2, no reflection electrode is provided in the transmission area TA, thereby defining a transmission hole (i.e., the reflection electrode 250 is formed spaced apart from the thin film transistor TFT). The insulating layer 203 is provided on the reflection electrode 250. The transmission electrode 260 is provided in the area corresponding to the transmission holes on the insulating layer 203. The transmission electrode 260 electrically contacts the drain electrode 222 of the thin film transistor TFT and the reflection electrode 250 within the first and second contact holes 240 and 241 defined through the insulating layer 203.

More specifically, the transmission electrode 260 that electrically contacting the drain electrode 222 of the thin film transistor TFT acts as a switching device through the first contact hole 240. The reflection electrode 250 formed on the lower substrate 200 with a predetermined distance from the TFT electrically contacts the transmission electrode 260 within the second contact hole 241.

As discussed above, since the reference color pixel AP has the structure where the drain electrode 222 of the thin film transistor TFT, the reflection electrode 250, and the transmission electrode 260 electrically contact one another, an equal data voltage level is applied to both the reflection electrode 250 and the transmission electrode 260. Therefore, both the reflection electrode 250 and the transmission electrode 260 are set at an equal gray level. Alternatively, the drain electrode 222 and the reflection electrode 250 may be directly connected to each other on the same plane without using the second contact hole 241, thereby omitting the second contact hole 241.

As shown in FIG. 3, in the correction color pixel BP, a data voltage applied to the transmission electrode 261 is reduced to a compensation voltage, and the compensation voltage is applied to the reflection electrode 251. The compensation voltage is a voltage induced to the reflection electrode 251 by applying the data voltage to the transmission electrode 261. The compensation voltage compensates a difference between the reflectivity-voltage characteristic curves of the reference color pixel AP and the correction color pixel BP.

The reflection electrode 251 and the transmission electrode 261 show in FIG. 3 do not physically contact each other. The transmission electrode 261 is formed on the upper portion of the insulating layer 203. The transmission electrode 261 covers an area corresponding to the transmission hole on the insulating layer 203. And, the transmission electrode 261 electrically contacts the drain electrode 222 within a first contact hole 240 defined through the insulating layer 203. In addition, a portion of the reflection electrode 251 and a portion of the transmission electrode 261 overlap each other having the insulating layer 203 therebetween, therefore the correction capacitance $C_{re}$ is formed in an overlapping portion of the reflection electrode 251 and the transmission electrode 261. When the thin film transistor TFT is turned on to apply a data voltage that corresponds to a predetermined gray level to the transmission electrode 261, the compensation voltage is induced to the reflection electrode 251 by the correction capacitance $C_{re}$.

The correction capacitance $C_{re}$ is proportional to the area of the overlapping portion of the reflection electrode 251 and the transmission electrode 261. Accordingly, the correction capacitance $C_{re}$ may be properly determined by the area of the overlapping portion. The correction color pixel BP of FIG. 3 can be manufactured by fabricating the gate electrode 211, the semiconductor layer 230, the source electrode 221 and the drain electrode 222, a lower insulating layer 202, the reflection electrode 251, the insulating layer 203, and the transmission electrode 261, respectively.

The upper and lower QWPs (quarter wave plate) 340 and 341 are additionally positioned on the upper portion of the upper substrate 300 and the lower portion of the lower substrate 200, respectively. Phase retardations of the upper and lower QWPs 340 and 341 (i.e., a disposition of optical axes of the upper and lower polarization plates 350 and 351) and a cell gap are considered. When cell gaps dΔn of the reflection area RA and the transmission area TA and the phase retardations of the upper and lower QWPs 340 and 341 are designed properly, a phase retardation of light traveling through the liquid crystal layer LC is controlled efficiently and a proper retardation difference between the upper and lower QWPs 340 and 341 is formed. Moreover, efficient usage of light in the reflection mode and the transmission mode improves greatly, and the color pixels R, G and B have a uniform switching performance.

As an exemplary example, designing processes of the phase retardations of the upper and lower QWPs 340 and 341 and the cell gap are discussed as follows. As mentioned earlier, light reflected on the exemplary transflective type liquid crystal display device travels through the liquid crystal layer LC twice as fast as that of the related art liquid crystal display device. Therefore, the cell gap in the transmission area TA is two times wider than the cell gap in the reflection area RA so that the retardation difference between the transmission area TA and the reflection area RA is compensated by reducing a difference in the lengths of optical paths between the transmission area TA and the reflection area RA. In other words, the exemplary transflective type liquid crystal display device adapts a dual-cell gap structure.

For instance, when the cell gap of the transmission area TA ranges from 200 to 300 nm, the cell gap of the reflection area RA ranges from 120 to 180 nm. The retardation difference between the upper and lower QWPs 340 and 341 in the transmission areas TA of each color pixel R, G and B are set to be equal to one another. The retardation difference between the upper and lower QWPs 340 and 341 is determined from the desired range of the transmittance-voltage characteristic curves defined for each color pixel in the transmission areas TA.

When optical axes of the upper and lower polarization plates 350 and 351 are perpendicular to each other, the upper QWP 340 has a phase retardation in a range of 140-180 nm and the lower QWP 341 has a phase retardation in a range of 100-140 nm, and the retardation difference between the upper and lower QWPs 340 and 341 is in a range of 20 to 60 nm.

Figure 4A:
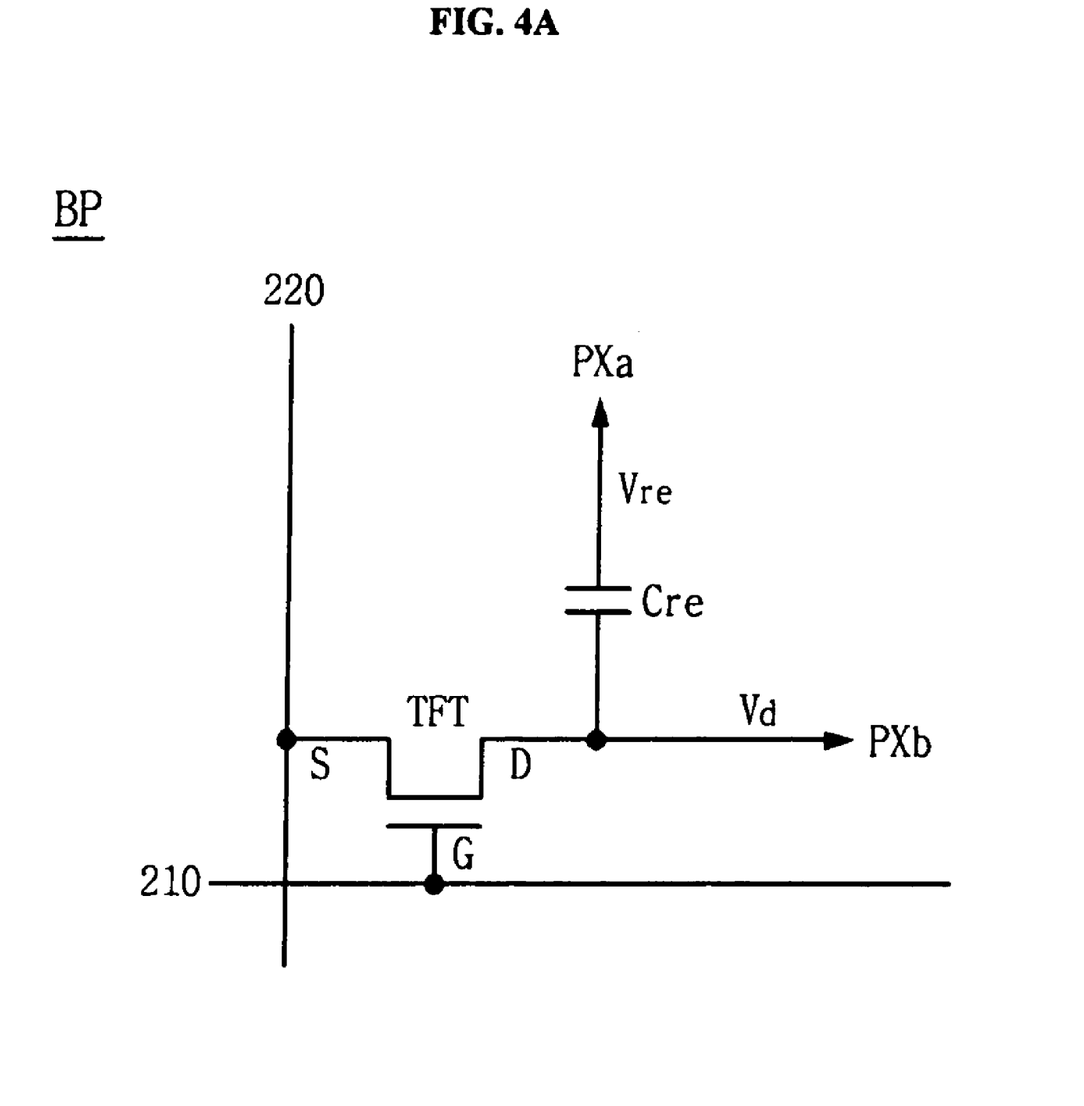
FIGS. 4A and 4B illustrate an exemplary structure of a correction color pixel of the first exemplary liquid crystal display device shown in FIG. 1.
Figure 4B:
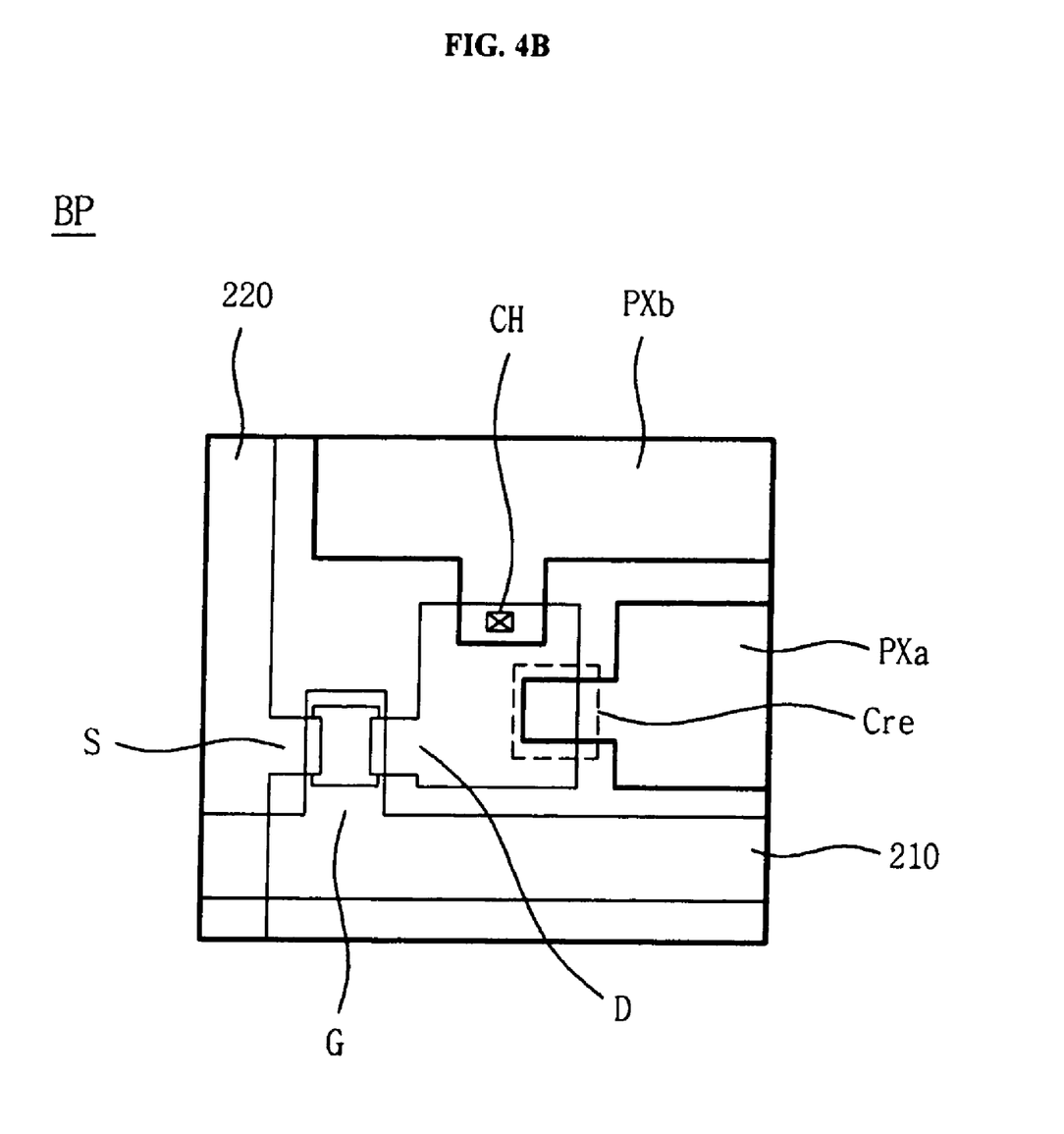

FIGS. 4A and 4B illustrate an exemplary structure of a correction color pixel BP shown in FIGS. 1 and 3. FIG. 4A is an exemplary circuit diagram of the correction color pixel BP, and FIG. 4B is plane view of the correction color pixel BP. It is assumed that the exemplary transflective type liquid crystal display device according to the first exemplary embodiment has a normal white (NW) mode to display white color when no voltage is applied to the liquid crystal layer LC.

As shown in FIGS. 4A and 4B, the correction color pixel BP includes the gate line 210 and the data line 220 where a gate electrode G and a source electrode S of the thin film transistor TFT are connected to the gate line 210 and the data line 220, respectively. A drain electrode D of the thin film transistor TFT is connected to a transmission electrode PXb and a correction capacitance $C_{re}$. The correction capacitance $C_{re}$ is a capacitance formed between a reflection electrode PXa and the transmission electrode PXb. The correction capacitance $C_{re}$, as shown in FIG. 4B, is formed when the drain electrode D which contacts the transmission electrode PXb within a contact hole CH and the reflection electrode PXa overlap each other with an insulating layer therebetween.

The correction capacitance $C_{re}$ may be formed when a portion of the reflection electrode PXa and a portion of the transmission electrode PXb directly overlap each other having the insulating layer therebetween. When a gate voltage supplied to the gate line 210 is supplied to the gate electrode G to turn on the thin film transistor TFT, a data voltage Vd supplied to the source electrode S through the data line 220 is output to the transmission electrode PXb through the drain electrode D. The data voltage $V_d$ is applied to the transmission electrode PXb through the drain electrode D, a voltage drop occurs by the correction capacitance $C_{re}$. And, a compensation voltage $V_{re}$ that is lower than the data voltage $V_d$ by a predetermined voltage is supplied to the reflection electrode PXa.

Figure 5:
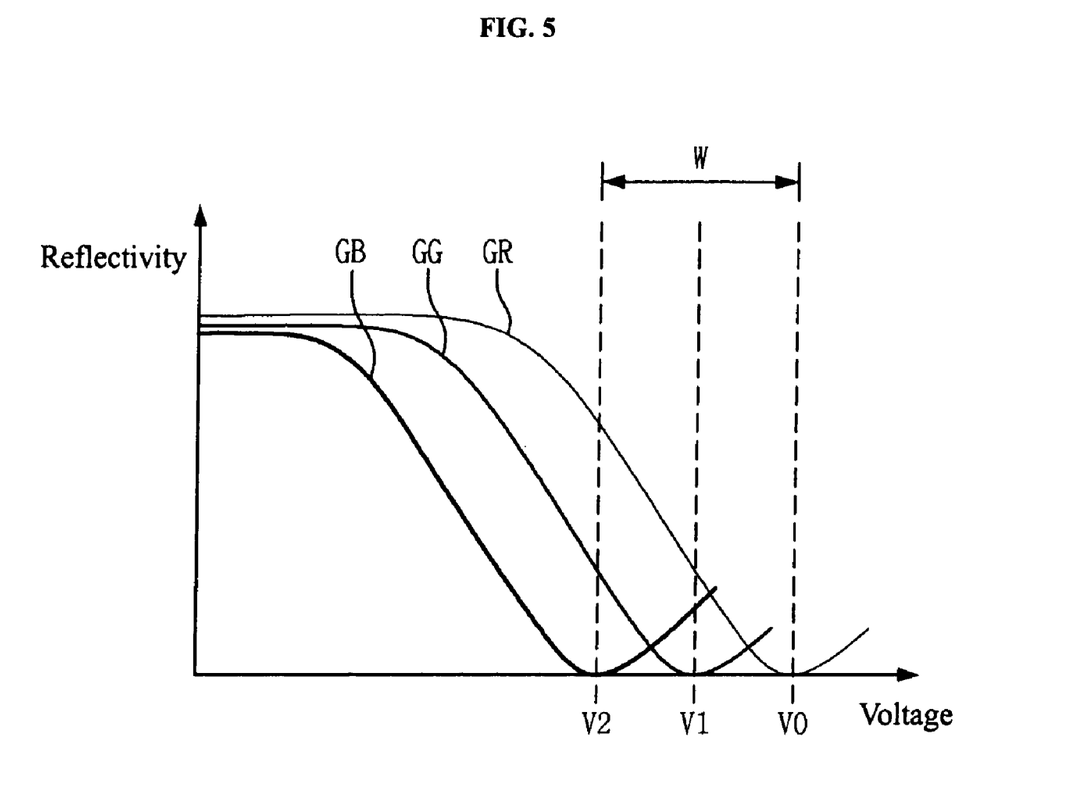
FIG. 5 is a graph showing an exemplary reflectivity-voltage characteristic curves obtained from each color pixel in a reflection area of the first exemplary liquid crystal display device shown in FIG. 1.

FIG. 5 is a graph showing a reflectivity-voltage characteristic curve obtained from each color pixels in the reflection area of the exemplary transflective liquid crystal display device of FIG. 1. In FIG. 5, GR, GG and GB are reflectivity-voltage characteristic curves of the red, green and blue color pixels R, G and B, respectively. V0, V1, V2 are black driving voltages satisfying a black condition (reflectivity=0) in the red, green and blue color pixels R, G and B, respectively.

As shown in FIG. 5, the red, green and blue color pixels R, G and B each have a different reflectivity-voltage characteristic curve. Accordingly, the retardation difference between the upper and lower QWPs 340 and 341 in each color pixels R, G and B is determined by the transmittance-voltage characteristic curve of each color pixels R, G and B. If the upper and lower QWPs 340 and 341 use the QWP (quarter wave plate) in a single-layer structure, the reflection areas RA of the color pixels R, G and B cannot have the same reflectivity-voltage characteristic curve. Therefore, such liquid crystal display device does not satisfy the black condition (reflectivity=0).

To satisfy the black condition, a wideband retardation film may be used instead of the upper and lower QWPs 340 and 341. The wideband retardation film has a multi-layered structure including the QWP in the single-layer structure and a half wave ($\lambda/2$) plate (HWP) in a single-layer structure. The wideband retardation film allows a change between linear polarization and circular polarization in a visible light band W (about 300-700 nm) in all the f red, green and blue wavelength bands. However, since the wideband retardation film is expensive and has the thicker structure, it is difficult to manufacture the desired liquid crystal display devices in a thinner structure at lower cost. To solve this problem, the reference color pixel AP or the correction reference color pixel BP are selectively applied depending on the choice of color pixels R, G and B.

The reflectivity-voltage characteristic curves of the color pixels R, G and B determine whether the reference color pixel AP is applied or the correction reference color pixel BP is applied. It is assumed that the reflection areas RA of the color pixels R, G and B have the reflectivity-voltage characteristic curves GR, GG and GB illustrated in FIG. 5, respectively. When the wideband retardation film is not used, the reflectivity-voltage characteristic curves of the red, green and blue color pixels R, G and B are different from one another. And, since the black driving voltages V0, V1 and V2 of the red, green and blue color pixels R, G and B are different from one another, the black conditions of the red, green and blue color pixels R, G and B are not equal to one another. This results in a reduction in the total luminance of the liquid crystal display device.

When the correction color pixel BP is applied to a portion of the color pixels, the data voltage applied to the color pixel having the correction color pixel BP through the thin film transistor TFT is reduced and output by the correction capacitance $C_{re}$ so that the reflectivity-voltage characteristic curves of the reflection areas RA of the color pixels are equal to each other. Accordingly, a reduction in brightness of the liquid crystal display device is minimized.

As an exemplary example, the blue color pixel B has a minimum reflectivity at the black driving voltage V2 which is lower than a black driving voltage V0 of the red color pixel R. A black driving voltage V1 is applied to the reflection electrode 251 of the green color pixel G in a dark state and the black driving voltage V0 is applied to the reflection electrode 250 of the red color pixel R. Accordingly, since a desired level of black driving voltage is applied to respective one of color pixels R, G, and B, the black conditions of the color pixels R, G and B can be set to equal to one another.

In FIG. 5, when the voltage is actually applied to the reflection electrode 251 of the blue color pixel B where the applied voltage is lower than that of the red and green color pixels R and G at an equal gray level, a difference between the reflectivity-voltage characteristic curves of the color pixels R, G and is compensated. The reflection electrode 251 of the blue color pixel B does not directly contact the drain electrode 222. A portion of the reflection electrode 251 and a portion of the transmission electrode 261 overlap each other having the insulating layer 203 therebetween, thereby forming the correction capacitance $C_{re}$ (FIG. 3). Therefore, a compensation voltage lower than the data voltage of the drain 222 is induced to the reflection electrode 251 of the reflection area RA.

The exemplary transflective type liquid crystal display device can also use an electrically controlled birefringence (ECB) mode where the initial alignment of liquid crystal of the liquid crystal layer LC is parallel to the upper and lower substrates 300 and 200 and the electrodes positioned on the upper and lower substrates 300 and 200 supply vertical electric filed to the liquid crystal. The correction capacitance $C_{re}$ varies voltages applied to the reflection electrodes 250 and 251 of the color pixels. Therefore, since the difference between the reflectivity-voltage characteristic curves of the color pixels are compensated without using the wideband retardation film of the multi-layered structure, the upper and lower QWPs 340 and 341 having the single-layered structure (i.e., a single-layered film having one optical axis) can be implemented, thereby minimizing the manufacture cost and the size of the liquid crystal display device.

As discussed above, it is assumed that the structures of the red, green and blue color pixels R, G and B are the same, the equal data voltage is applied to the reflection electrodes 250 and 251 of the color pixels R, G and B at an equal gray level, and the upper and lower QWPs 340 and 341 are formed on the upper and lower substrates 300 and 200. In addition, the voltage applied to the reflection electrode 251 of the blue color pixel B is controlled to be different from voltages applied to the reflection electrodes 250 of the red and green color pixels R and G at an equal gray level. Accordingly, the reflectivity-voltage characteristic curves of the color pixels R, G and B in the reflection areas RA are made equal to one another. Moreover, the retardation difference between the upper and lower QWPs 340 and 341 is determined from the transmittance-voltage characteristic curves obtained in the transmission areas TA of the red, green and blue color pixels R, G and B, where the transmittance-voltage characteristic curves of color pixels are set to equal to each other.

To improve reflectivity-voltage characteristics of the color pixels R, G and B by applying a different voltage to each color pixels R, G and B, a driver (not illustrated) may control voltages applied to the color pixels R, G and B at an equal gray level. However, in this case, manufacturing cost increases and the structure of the liquid crystal display device is complicated due to an increase in the number of driver chips or the number of data lines.

The above described liquid crystal display devices have been developed with respect to a case where the red and green color pixels R and G are the reference color pixel AP and the blue color pixel B is the correction color pixel BP, the exemplary embodiment is not limited thereto. Variation is possible as long as the reflectivity-voltage characteristic curves of the red, green and blue color pixels R, G and B are close to each other.

Figure 6:
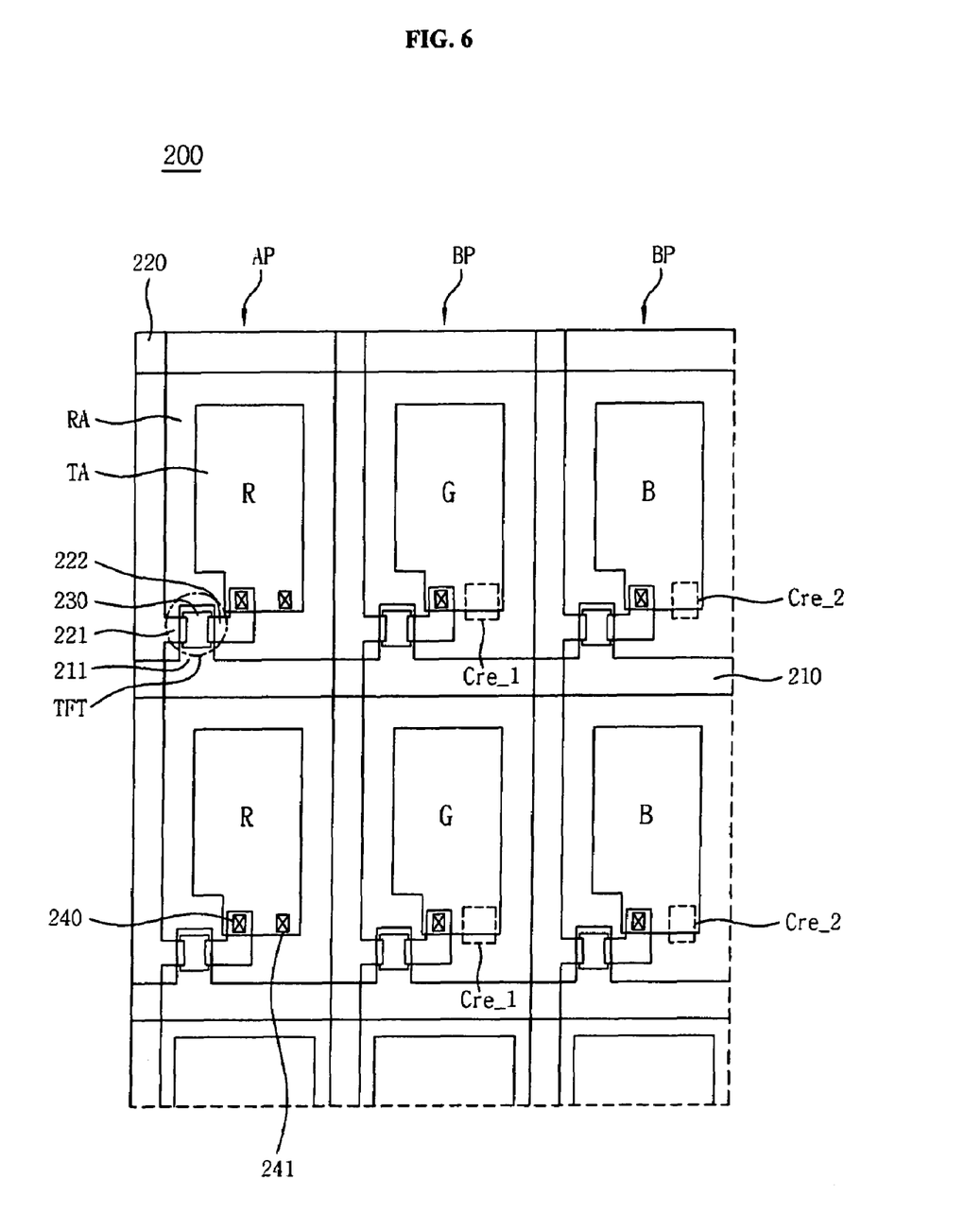
FIG. 6 is a plane view of an exemplary transflective type liquid crystal display device according to a second exemplary embodiment.

FIG. 6 is a plane view of an exemplary transflective type liquid crystal display device according to a second exemplary embodiment. A color of the color pixels determines whether a reference color pixel is applied or a correction color pixel is applied. When at least two of the color pixels are set as the correction color pixels, a correction capacitance is determined depending on the colors of the two color pixels. As shown in FIG. 6, a red color pixel R of red is set to be the reference color pixel AP, and the green and blue color pixels G and B having correction capacitances are set to be the correction color pixel BP.

In this case, a correction capacitance $C_{re\_}1$ of the green color pixel G may be greater than a correction capacitance $C_{re\_}2$ of the blue color pixel B. The correction color pixels BP for the green pixel G and the blue pixel B have a different correction capacitance in voltage induction. More specifically, when actual voltages (data voltage or compensation voltage) applied to the red, green and blue color pixels R, G and B (i.e., indicated as V(R), V(G) and V(B), respectively), a relationship among the actual voltages V(R), V(G) and V(B) applied to reflection electrodes 250 and 251 formed in the reflection areas RA of the red, green and blue color pixels R, G and B at an equal gray level is set as follows: $V(B)<V(G)<V(R)$.

In the reflectivity-voltage characteristic curve of FIG. 5, the black driving voltages V0, V1, V2 of the red, green and blue color pixels R, G and B satisfy the following relationship: $V2<V1<V0$. Therefore, when the voltages V(R), V(G) and V(B) applied to the reflection area RA satisfy the following relationship: $V(B)<V(G)<V(R)$, the red, green and blue color pixels R, G and B can have the equal luminance at the equal gray level.

Accordingly, a retardation difference between the red, green and blue color pixels R, G and B is fully compensated without using a wideband retardation film such that the reflectivity-voltage characteristics of the color pixels R, G and B are equal to one other and the liquid crystal display device having a maximum luminance can be achieved. In addition, the reference color pixel AP and the correction color pixel BP may be applied to a reflective type liquid crystal display devices.

Figure 7:
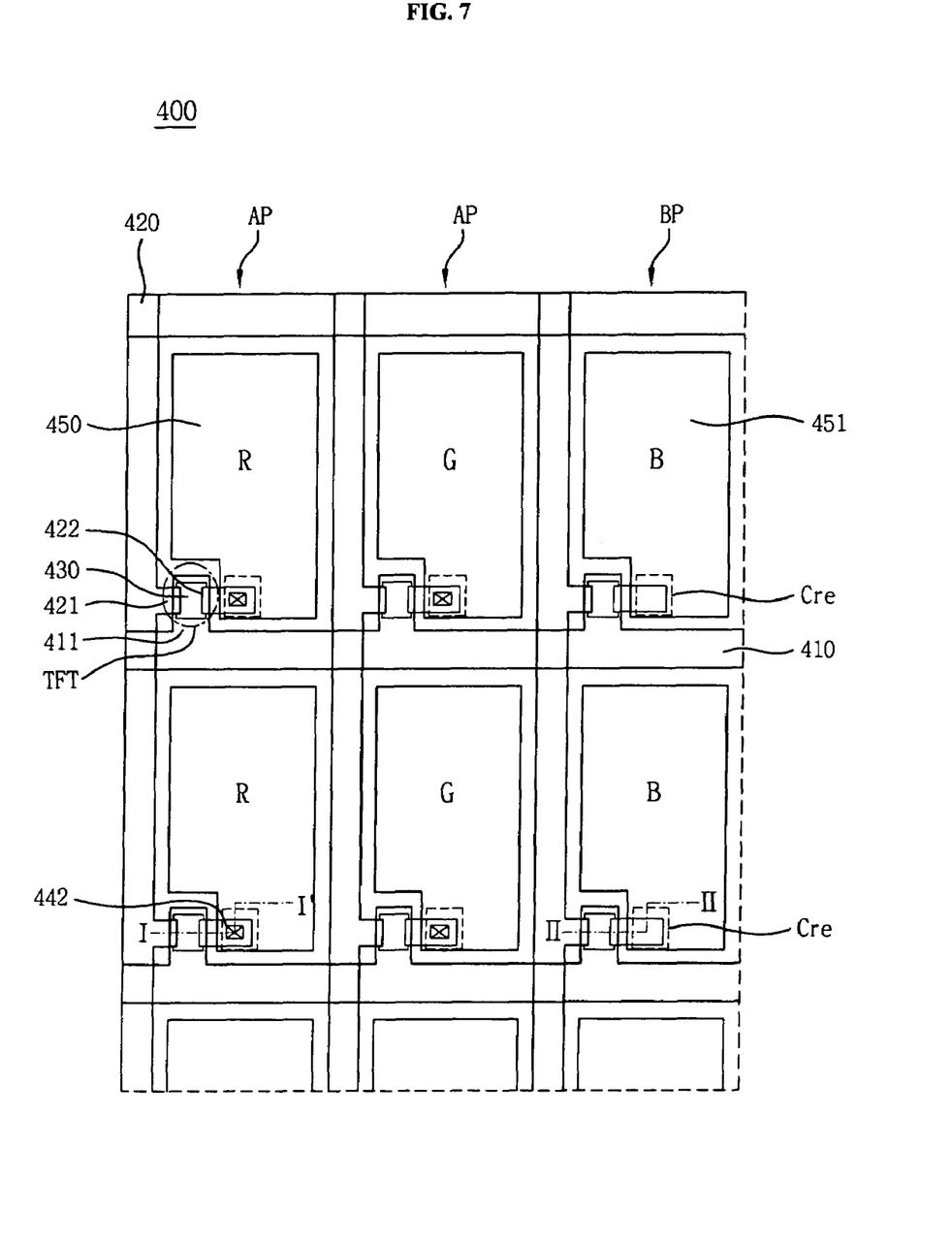
FIG. 7 is a plane view of an exemplary reflective type liquid crystal display device according to a third exemplary embodiment.
Figure 8:
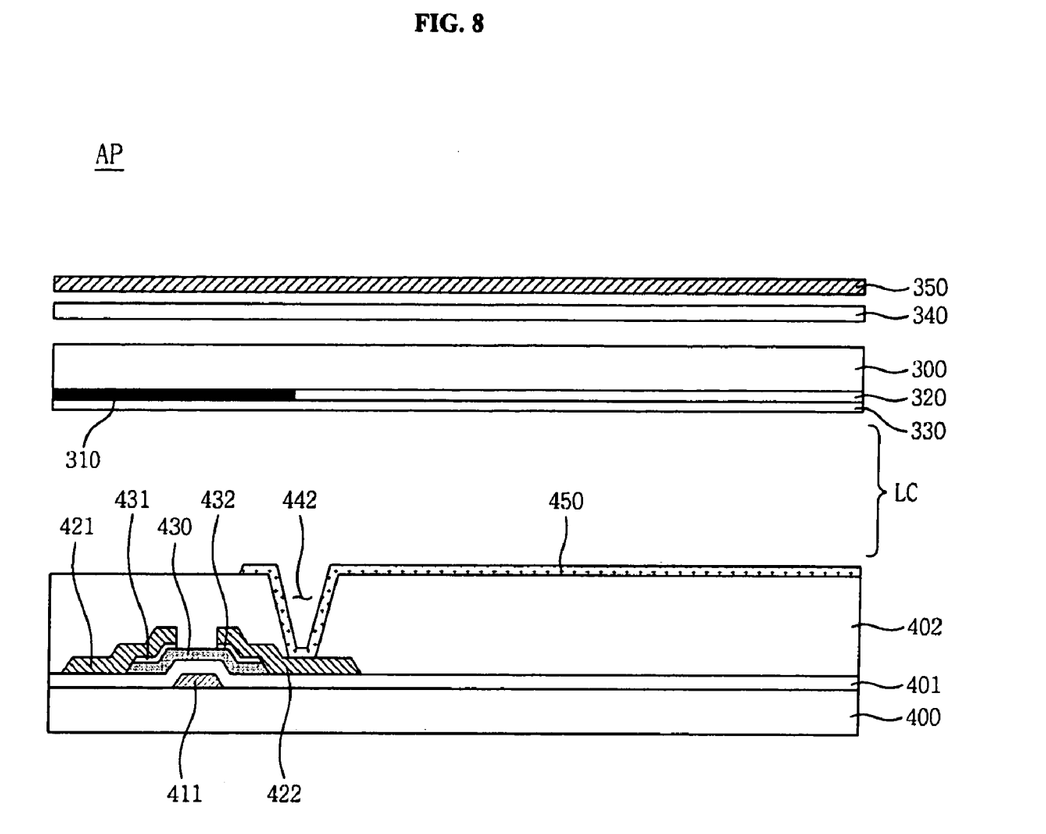
FIG. 8 is a cross-sectional view taken along line I-I' of the third exemplary liquid crystal display of FIG. 7.

FIG. 7 is a plane view of an exemplary reflective type liquid crystal display device according to a third exemplary embodiment. FIG. 8 is a cross-sectional view taken along line I-I' of the exemplary liquid crystal display device of FIG. 7 and FIG. 9 is a cross-sectional view taken along line II-II' of the exemplary liquid crystal display device of FIG. 7.

Figure 9:
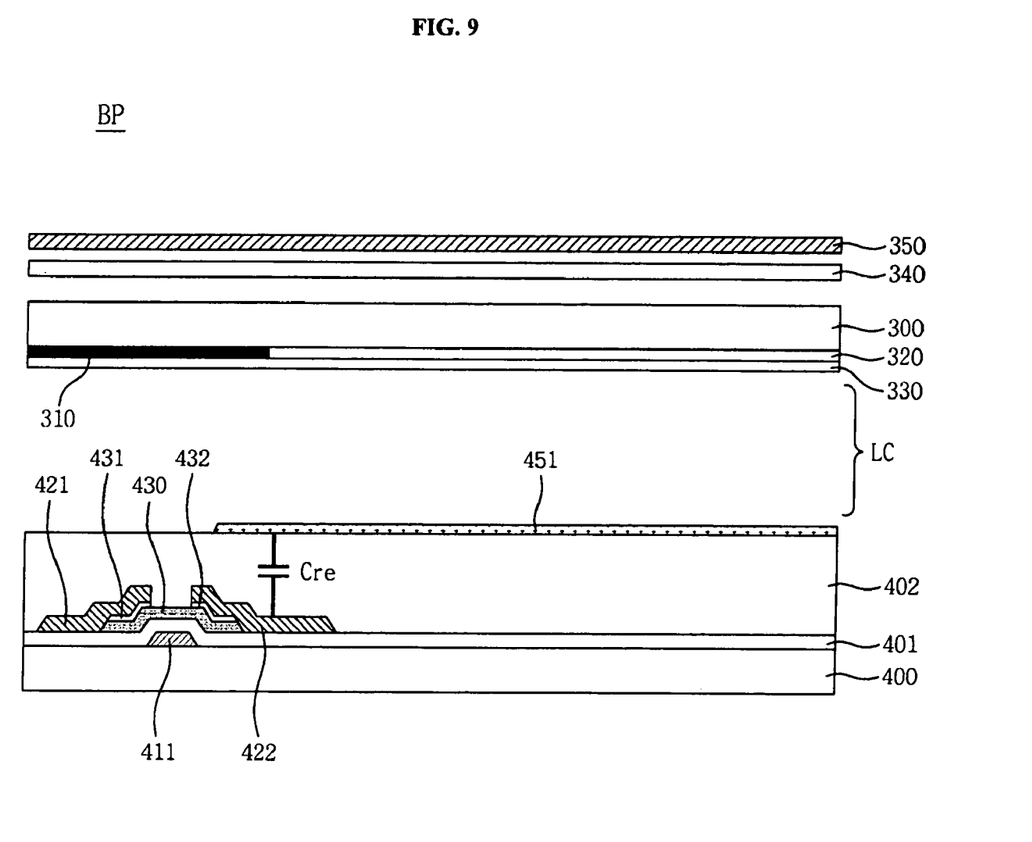
FIG. 9 is a cross-sectional view taken along line II-II' of the third exemplary liquid crystal display of FIG. 7.

As shown in FIGS. 7 to 9, the exemplary reflective type liquid crystal display device includes upper and lower substrates 300 and 400 facing each other, and a liquid crystal layer LC positioned between the upper and lower substrates 300 and 400. An upper QWP 340 is formed on an upper portion of the upper substrate 300. Voltages applied to reflection electrodes 450 and 451 in the red, green and blue color pixels R, G and B at each gray level are controlled depending on a color of the color pixels. A plurality of gate lines 410 and a plurality of data lines 420 are provided on the lower substrate 400 to intersect each other perpendicularly. The intersections of the gate line 410 and the data line 420 define an area of each red, green and blue color pixels R, G and B. A thin film transistor TFT is formed at the intersection of the gate line 410 and the data line 420. An upper QWP 340 and an upper polarization plate 350 are additionally formed on an upper portion of the upper substrate 300. The upper QWP 340 is formed in a single-layered film having one optical axis.

The thin film transistor TFT includes a gate electrode 411, a gate insulating layer 401 positioned thereon, a semiconductor layer 430, resistance contact layers 431 and 432, and a source electrode 421 and the drain electrode 422 over the semiconductor layer 430. The red, green and blue color pixels R, G and B may be divided into an exemplary reference color pixel AP and an exemplary correction color pixel BP. In addition, an insulating layer 402 covers the thin film transistor TFT. The reflection electrodes 450 and 451 are provided on an upper portion of the insulating layer 402, where the reflection electrodes 450 and 451 contact a drain electrode 422 of the thin film transistor TFT within a third contact hole 442.

In the exemplary reference color pixel AP, a data voltage supplied to the drain electrode 422 of the thin film transistor TFT is applied to the reflection electrode 450 without changing a magnitude of the data voltage. In the exemplary correction color pixel BP, a data voltage supplied to the drain electrode 422 of the thin film transistor TFT is reduced to a compensation voltage, and the compensation voltage is applied to the reflection electrode 451. In other words, when the data voltages are supplied to the drain electrodes 422 of the red, green and blue color pixels R, G and B, there is no change in the magnitude of the data voltage applied to the reflection electrode 450 of the reference color pixel AP, and the compensation voltage lower than the data voltage is applied to the reflection electrode 451 of the correction color pixel BP.

FIGS. 8 and 9 are cross-sectional views of the exemplary reference color pixel AP and the exemplary correction color pixel BP, respectively. In the correction color pixel BP of FIG. 8, the reflection electrode 450 electrically contacts the drain electrode 422 of the thin film transistor TFT within the third contact hole 442. In the correction color pixel B of FIG. 9, a portion of the reflection electrode 451 and a portion of the drain electrode 422 overlap each other having the insulating layer 402 therebetween to form a correction capacitance $C_{re}$ where the correction capacitance $C_{re}$ has a predetermined value.

The correction capacitance $C_{re}$ is proportional to the overlapping area of the reflection electrode 451 and the drain electrode 422. The compensation voltage of the correction color pixel BP having the correction capacitance $C_{re}$ is a black driving voltage to minimize reflectivity in a reflectivity-voltage characteristic curve of the correction color pixel BP.

As described above, the liquid crystal display device including the array substrate of the present invention apply different data voltages to the reflection areas of the color pixels at each gray level by improving the structure of the color pixels. Accordingly, the liquid crystal display is manufactured at lower cost and the thin profile is achieved.

It will be apparent to those skilled in the art that various modifications and variations can be made in the liquid crystal display device and array substrate for the same of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
a first substrate;
a second substrate facing the first substrate including a color pixel, the color pixel including a reference color pixel and a correction color pixel, the reference color pixel and the correction color pixel each including a reflection area and a transmission area, the reference color pixel and the correction color pixel each including a thin film transistor, a reflection electrode provided in the reflection area, and a transmission electrode provided in the transmission area to be electrically connected to the thin film transistor; and
a liquid crystal layer provided between the first substrate and the second substrate, wherein a data voltage applied to the transmission electrode of the reference color pixel is applied to the reflection electrode of the reference color pixel, and the data voltage applied to the transmission electrode of the correction color pixel is reduced to a compensation voltage, wherein the compensation voltage is applied to the reflection electrode of the correction color pixel.

2. The liquid crystal display device of claim 1, further comprising first and second quarter wave plates (QWPs) provided on the first substrate and the second substrate, respectively to compensate a retardation difference of light traveling through the liquid crystal layer, and first and second polarization plates provided on the first QWP and the second QWP, respectively.

3. The liquid crystal display device of claim 2, wherein each of the first and second QWPs is a single-layered film having one optical axis.

4. The liquid crystal display device of claim 1, wherein the reflection electrode and the transmission electrode of the reference color pixel electrically contact each other, and the reflection electrode and the transmission electrode of the correction color pixel having an insulating layer therebetween form a correction capacitance.

5. The liquid crystal display device of claim 4, wherein when the data voltage is applied to the transmission electrode of the correction color pixel, the compensation voltage is induced by the correction capacitance and the compensation voltage is applied to the reflection electrode of the correction color pixel.

6. The liquid crystal display device of claim 4, wherein a color of the color pixel determines a selection of implementing the reference color pixel or the correction color pixel.

7. The liquid crystal display device of claim 6, wherein the color pixel is one of red, green and blue color pixels, the red and green color pixels are the reference color pixels, and the blue color pixel is the correction color pixel.

8. The liquid crystal display device of claim 4, wherein a color of the color pixel determines a selection of implementing the reference color pixel or the correction color pixel, and a magnitude of the correction capacitance.

9. The liquid crystal display device of claim 8, wherein the color pixel is one of red, green and blue color pixels, the red color pixel is the reference color pixel, and the green and blue color pixels are the correction color pixels having correction capacitance, and the correction capacitance of the green color pixel is greater than the correction capacitance of the blue color pixel.

10. The liquid crystal display device of claim 4, wherein the correction capacitance formed in the correction color pixel is proportional to an overlapping area of the reflection electrode and the transmission electrode of the correction color pixel.

11. The liquid crystal display device of claim 4, wherein the compensation voltage of the correction color pixel compensates a difference between a reflectivity-voltage characteristic curve of the reference color pixel and a reflectivity-voltage characteristic curve of the correction color pixel.

12. A liquid crystal display device, comprising:
a first substrate;
a second substrate facing the first substrate including a color pixel, the color pixel including a reference color pixel and a correction color pixel, the reference color pixel and the correction color pixel each includes a thin film transistor and a reflection electrode electrically connected to the thin film transistor; and a liquid crystal layer provided between the first substrate and the second substrate, wherein a data voltage applied to the thin film transistor of the reference color pixel is applied to the reflection electrode of the reference color pixel, the data voltage applied to the thin film transistor of the correction color pixel is reduced to a compensation voltage, and the compensation voltage is applied to the reflection electrode of the correction color pixel.

13. The liquid crystal display device of claim 12, further comprising a first QWP provided on the first substrate, and a first polarization plate provided on the first QWP.

14. The liquid crystal display device of claim 13, wherein the first QWP is a single-layered film having one optical axis.

15. The liquid crystal display device of claim 12, wherein the reflection electrode of the reference color pixel electrically contacts a drain electrode of the thin film transistor of the reference color pixel, and the reflection electrode and a drain electrode of the thin film transistor of the correction color pixel having an insulating layer therebetween form a correction capacitance.

16. The liquid crystal display device of claim 15, wherein the correction capacitance formed in the correction color pixel is proportional to an overlapping area of the reflection electrode and the drain electrode of the correction color pixel.

17. The liquid crystal display device of claim 12, wherein the compensation voltage of the correction color pixel compensates a difference between a reflectivity-voltage characteristic curve of the reference color pixel and a reflectivity-voltage characteristic curve of the correction color pixel.

18. An array substrate, comprising:
a gate line and a data line intersecting perpendicularly to each other to define an area of a color pixel, wherein the color pixel includes a reference color pixel and a correction color pixel;
a thin film transistor at an intersection of the gate line and the data line;
a reflection electrode provided in a reflection area of the color pixel; and
a transmission electrode provided in a transmission area of the color pixel, the transmission electrode electrically connected to the thin film transistor, wherein a data voltage applied to the transmission electrode of the reference color pixel is applied to the reflection electrode of the reference color pixel, the data voltage applied to the transmission electrode of the correction color pixel is reduced to a compensation voltage, and the compensation voltage is applied to the reflection electrode of the correction color pixel.

19. The array substrate of claim 18, wherein the thin film transistor includes a gate electrode, a semiconductor layer, a source electrode, and a drain electrode, the reflection electrode is formed having a discontinued portion and is provided spaced apart from the thin film transistor having a predetermined distance therebetween, and an insulating layer is provided between the reflection electrode and the transmission electrode.

20. The array substrate of claim 19, wherein the transmission electrode of the reference color pixel covers an area corresponding to the discontinued portion of the reflection electrode on the insulating layer, and the transmission electrode of the reference color pixel electrically contacts the drain electrode and the reflection electrode of the reference color pixel within a contact hole defined through the insulating layer.

21. The array substrate of claim 19, wherein the transmission electrode of the correction color pixel covers an area corresponding to the discontinued portion of the reflection electrode on the insulating layer, the transmission electrode of the correction color pixel electrically contacts the drain electrode of the correction color pixel within a contact hole defined through the insulating layer, and the transmission electrode and the reflection electrode having the insulating layer therebetween of the correction color pixel form a correction capacitance.

* * * * *